US010853686B2

(12) United States Patent
Jain et al.

(10) Patent No.: US 10,853,686 B2
(45) Date of Patent: *Dec. 1, 2020

(54) GENERATION OF SALIENT CONTOURS USING LIVE VIDEO

(71) Applicant: ADOBE INC., San Jose, CA (US)

(72) Inventors: Atishay Jain, Noida (IN); Shamit Kumar Mehta, Delhi (IN); Stakshi Jindal Garg, Noida (IN); Geoffrey Charles Dowd, San Francisco, CA (US); Arian Behzadi, San Francisco, CA (US); Joseph Michael Andolina, San Francisco, CA (US); David Ericksen, Lehi, UT (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,246

(22) Filed: May 3, 2019

(65) Prior Publication Data

US 2019/0258893 A1 Aug. 22, 2019

Related U.S. Application Data

(63) Continuation of application No. 15/242,080, filed on Aug. 19, 2016, now Pat. No. 10,325,175, which is a
(Continued)

(51) Int. Cl.
*G06K 9/46* (2006.01)
*G06K 9/62* (2006.01)
(Continued)

(52) U.S. Cl.
CPC .......... *G06K 9/4671* (2013.01); *G06K 9/468* (2013.01); *G06K 9/4609* (2013.01); *G06K 9/6212* (2013.01); *G06K 9/80* (2013.01); *G06T 5/002* (2013.01); *G06T 7/12* (2017.01); *G06T 7/13* (2017.01); *G06T 7/194* (2017.01); *H04N 5/23229* (2013.01); *H04N 5/272* (2013.01); *H04N 21/44008* (2013.01);
(Continued)

(58) Field of Classification Search
USPC ........................................................ 382/199
See application file for complete search history.

(56) References Cited

U.S. PATENT DOCUMENTS

| 8,363,939 B1 | 1/2013 | Khosla et al. |
| 8,842,191 B2 | 9/2014 | Melikian |
| 8,923,607 B1 | 12/2014 | Kwatra et al. |
| 9,171,578 B2 | 10/2015 | Lu et al. |

(Continued)

*Primary Examiner* — Ishrat I Sherali
(74) *Attorney, Agent, or Firm* — Shook, Hardy & Bacon L.L.P.

(57) ABSTRACT

In various implementations, a computing device is configured to provide a live preview of salient contours generated on a live digital video feed. In particular, a designer can use a computing device with a camera, such as a smart phone, to view a real-time preview of salient contours generated from edges detected in frames of a live digital video feed prior to capture, thereby eliminating the unpredictability of salient contours generated from a previously captured image. In some implementations, the salient contours are overlaid on a greyscale conversion of the live digital video feed for improved processing and visual contrast. Other implementations modify aspects of edge-detecting or post-processing filters for improved performance on mobile computing devices.

20 Claims, 10 Drawing Sheets

Related U.S. Application Data continuation of application No. 14/645,581, filed on Mar. 12, 2015, now Pat. No. 9,449,248.

(51) Int. Cl.

| | | |
|---|---|---|
| *G06K 9/80* | (2006.01) | |
| *G06T 5/00* | (2006.01) | |
| *H04N 21/44* | (2011.01) | |
| *G06T 7/13* | (2017.01) | |
| *G06T 7/194* | (2017.01) | |
| *H04N 5/232* | (2006.01) | |
| *H04N 5/272* | (2006.01) | |
| *G06T 7/12* | (2017.01) | |

(52) U.S. Cl.
CPC .............. *G06T 2200/24* (2013.01); *G06T 2207/10016* (2013.01); *G06T 2207/10024* (2013.01); *H04N 5/23293* (2013.01)

(56) References Cited

U.S. PATENT DOCUMENTS

| | | |
|---|---|---|
| 9,195,903 B2 | 11/2015 | Andreopoulos et al. |
| 9,449,248 B1* | 9/2016 | Jain ................. G06K 9/6212 |
| 10,325,175 B2* | 6/2019 | Jain ................. G06K 9/6212 |
| 2008/0212873 A1 | 9/2008 | Allen |
| 2009/0252419 A1 | 10/2009 | Knee |
| 2010/0097455 A1 | 4/2010 | Zhang et al. |
| 2013/0127856 A1 | 5/2013 | Winnemoeller et al. |
| 2013/0162806 A1* | 6/2013 | Ding ................. G01B 11/028 348/86 |
| 2014/0321731 A1* | 10/2014 | Bryll ................. G06T 7/136 382/152 |
| 2014/0366057 A1* | 12/2014 | Brockmann ....... H04N 21/4348 725/37 |
| 2015/0046953 A1 | 2/2015 | Davidson et al. |
| 2015/0055821 A1 | 2/2015 | Fotland |
| 2015/0235379 A1 | 8/2015 | O'Gorman et al. |
| 2016/0070962 A1 | 3/2016 | Shetty et al. |

* cited by examiner

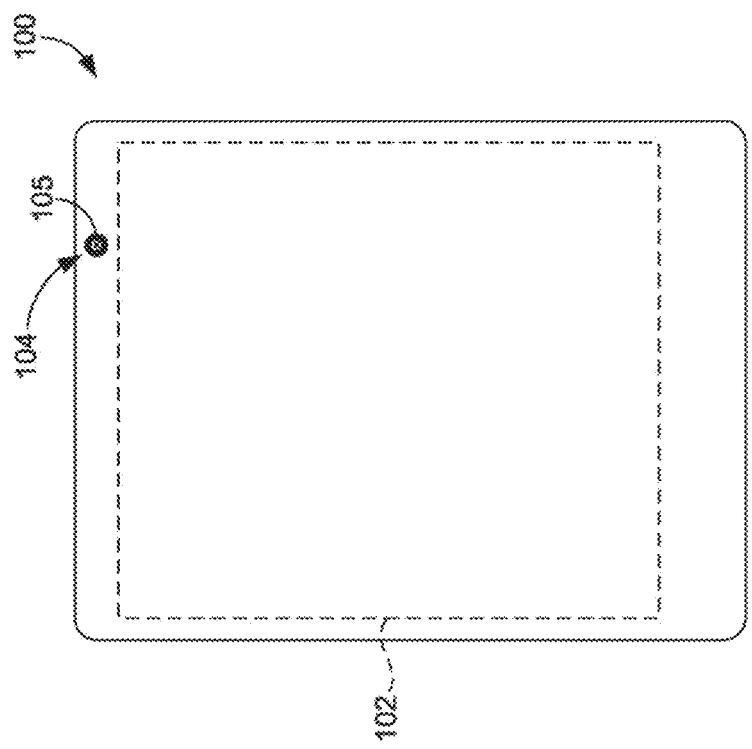
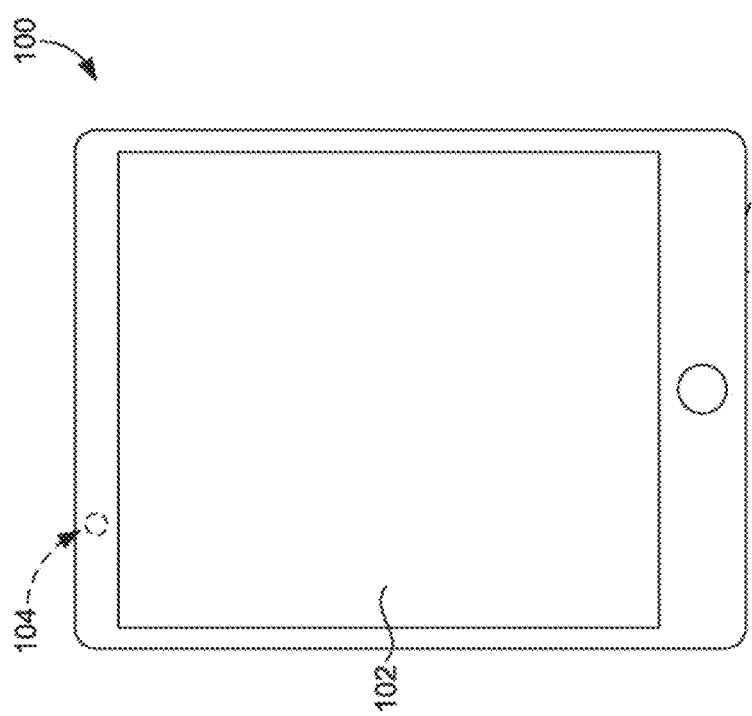
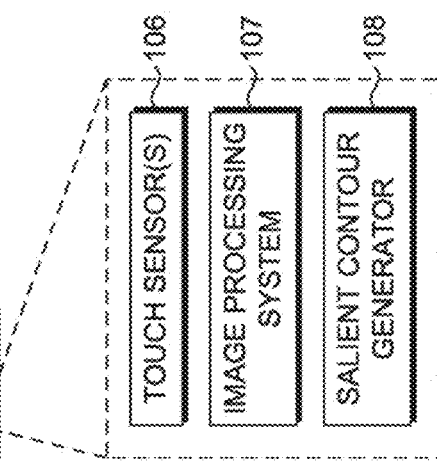
FIG. 1A
FIG. 1B

GENERATION OF SALIENT CONTOURS USING LIVE VIDEO

CROSS-REFERENCE TO RELATED APPLICATIONS

This application is a continuation of and claims priority from U.S. application Ser. No. 15/242,080, filed Aug. 19, 2016, entitled "Generation of Salient Contours Using Live Video," which itself is a Continuation of Ser. No. 14/645,581, filed Mar. 12, 2015, entitled "Generation of Salient Contours Using Live Video," which is now issued as U.S. Pat. No. 9,449,248. The entire contents of each of the foregoing applications, which are assigned or under obligation of assignment to the same entity as this application, are herein incorporated by reference.

BACKGROUND

To a graphics designer, inspiration can come from a number of sources. Sketches, for instance, provide to be a good starting point for some designers. For others, images or natural occurrences of nature frequently provide inspiration. Such inspiration for designs can be encountered and captured in an image anytime and anywhere. To this end, an important workflow in the creative process is directed to the generation of salient contours based on a captured image. More particularly, salient contours representing or bounding a shape or form of an item in a captured image can be generated and, thereafter, used by a graphic designer as a starting point for creating a design.

Traditionally, the generation of salient contours has been an offline process, whereby a designer takes captured images to a studio and relies on graphics design tools, such as Adobe® Photoshop® or Adobe® Illustrator®, to generate salient contours from the captured images. Even with the prevalence of mobile device technologies (e.g., smartphone cameras) enabling graphic designers to capture inspiration at sometimes unexpected occasions, such an offline process limits the output salient contours based on the previously captured image. For example, various factors associated with the captured image, such as lighting, camera angle, background contrast, and/or object motion, can greatly affect the outcome of the salient contours derived therefrom as the traditional offline approach of salient contour generation does not provide for after-the-fact adjustments of the captured image. As such, in the event the designer is not satisfied with the salient contours generated from the captured image, the designer would need recreate the previous occasion/location at which the image was captured, if even possible, in an effort to recreate salient contours.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention are directed to providing a live preview of salient contours generated in real-time in accordance with a live digital video feed. In particular, a designer can use a computing device with a digital camera, such as a smart phone, to view a real-time preview of salient contours generated based on a live video frame or image to be captured, thereby eliminating the unpredictability of salient contour generation of a previously captured image. A preview of salient contours overlaying a live video frame can provide the designer with the flexibility to adjust lighting, camera angle, and in some cases, the background, to identify and capture salient contours desired by the designer. In this regard, a designer can experiment with a scene to capture a desired end result. For example, a designer may adjust lighting and/or camera angle to increase contrast for improved noise removal resulting in salient contours preferred by the designer.

In accordance with aspects of the present disclosure, a live digital video feed is processed through an edge-detecting filter to detect edges of items within a live frame of the live digital video feed. Based on the edge detection, smooth renderings of salient contours can be generated and overlaid onto the live digital video feed to provide the user with a preview of the salient contours that would be generated and/or captured as a result of the user capturing a corresponding image. As a preview of salient contours is visible to the user over the live digital video feed, the unpredictability of salient contour generation of a previously captured image is substantially reduced or practically eliminated.

BRIEF DESCRIPTION OF THE DRAWINGS

The present invention is described in detail below with reference to the attached drawing figures, wherein:

FIGS. 1A-1B are respective front and rear views illustrating a block diagram of an exemplary computing environment suitable for use in implementing embodiments of the present invention;

DETAILED DESCRIPTION

Figure 2:
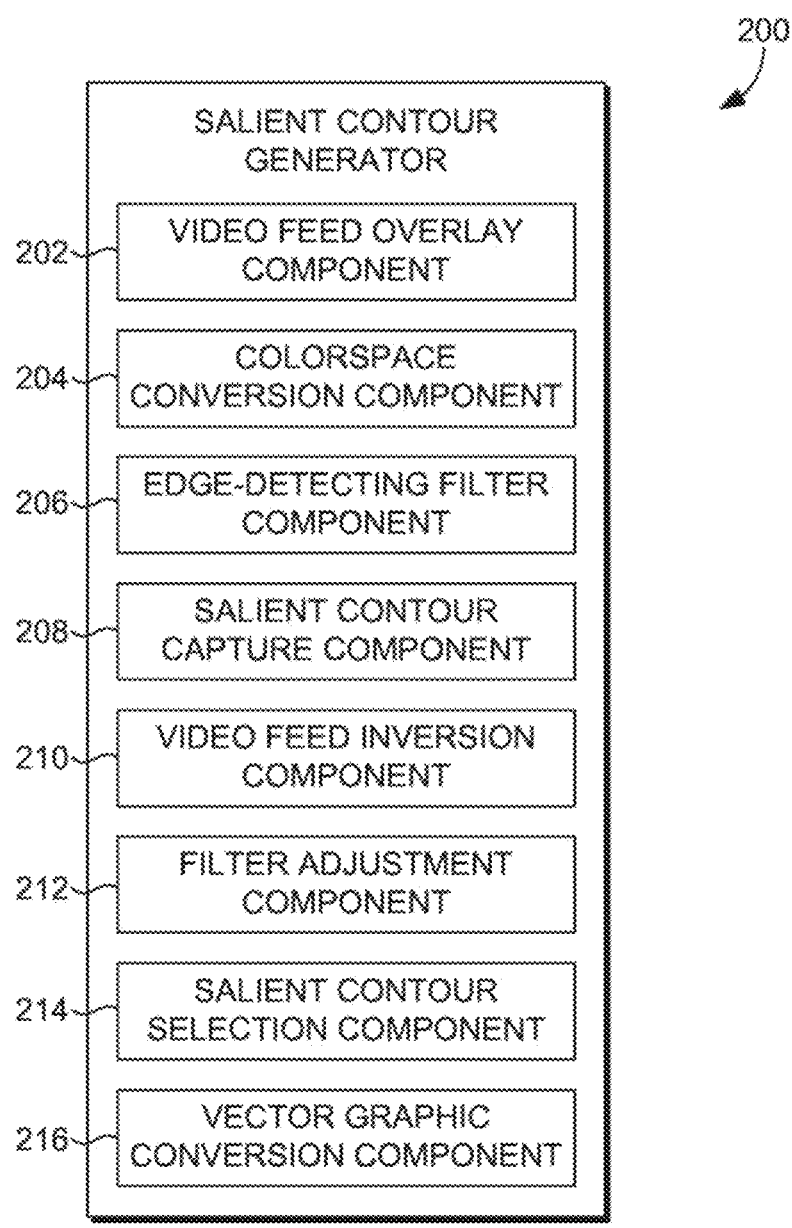
FIG. 2 is a block diagram of an exemplary salient contour generator for facilitating live previews of salient contours associated with a live digital video feed, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Salient contours are typically used by designers to produce artistic renditions of objects derived from images. As used herein, a contour refers to a representation or bound of a shape or form of an item in an image. As such, a contour can be used to depict an outline or edge of an item in an image, which can be used by a graphic designer as a starting point for creating a design. Although salient (e.g., important or prominent) is generally used herein to describe a contour(s), contours are not intended to be limited thereto. Contours may include any representation or bound of a shape or form appearing within an image, not to exclude objects in the background, foreground, or intruding within the image.

Generally, salient contour generation utilizes data from edge-detecting filters for rendering artistically-rendered outlines of objects appearing in images. Edge-detecting filters, as will be described in more detail herein, are used to detect boundaries of contrasting visual features associated with one or more objects in an image. For example, outlines of a design on a coffee mug, a unique symbol on a company letterhead, or a potted plant sitting on a desk, can all be detected by an edge-detecting filter and artistically drawn in the form of salient contours for use in a design workflow.

Generation of salient contours has generally been an offline process. Traditional approaches to salient contour generation require a capturing of images using, for instance, an analog or digital camera. Provided with a captured image, the image is transferred to a computing device using, for instance, a scanner or by way of common data transfer technologies. The image is then processed using edge-detecting filters in a graphics design tool to generate the salient contours. Due to the fact that the image is static and the opportunity to adjust conditions during the time of capture have passed, a poorly captured image may result in an undesirable generation of salient contours. As such, a designer can be inconvenienced with returning to the place of inspiration, if even possible or desirable, and risk additional inefficiencies when capturing another static image to take back to the studio for processing.

Salient contour generation has typically been performed in a studio setting due to constraints in portability of processor-intensive hardware. In more detail, edge-detecting filters can comprise a plurality of algorithms for analyzing images and/or video frames, each of which requires intensive processing power and memory. The art of salient contour generation can incorporate multiple filters by way of filter chains for edge-detection and/or salient contour generation to produce aesthetically pleasing designs. The downside of complex filters and filter chains, however, is that their algorithms are typically designed for use with graphics-intensive processors, typically found in large computers, and operable to process multiple layers of float data-type (i.e., values with potential decimal places) calculations.

In accordance with embodiments described herein, the inefficiencies of processing previously captured images to generate salient contours after-the-fact can be reduced or eliminated. In this regard, as opposed to the offline approach of taking an image and processing the image after capture, the present invention is directed to providing a live preview of the expected salient contours to be output to the designer. More particularly, a live preview of the salient contours to be generated is presented to a user as an overlay in a live digital video feed in real-time. The term "real-time" as used throughout this description can be interpreted as a temporal description including, among other things, simultaneous, contemporaneous, substantially concurrent, or substantially in-sync to a live occurrence of an event. Any of the aforementioned temporal descriptions can include temporal measurements (e.g., 0.01 ms to 1 sec) sufficient to provide the illusion that an action or process is occurring at the same time as the live occurrence.

In some instances, previewing salient contours over a live video feed can pose a challenge when rendering salient contours employing traditional post-processing filters. More particularly, salient contours can generally be rendered offline without issue, when using traditional open/close filters, as will be described in more detail herein. Open/close filters, however, employ a decision making process that is too binary for live salient contour generation and preview, which may result in excessive flickering and undesirable noise. For example, threshold filters are traditionally employed for salient contour generation on static images. These threshold filters are used to convert gradient pixels to a close-neighboring color (i.e., dark grey to black, or light grey to white), depending on how close the pixel value is to the neighboring color. To this end, when the threshold filter is employed in a live video application, the binary nature of the filter can result in excessive flickering and noise. As such, and in accordance with embodiments described herein, problems associated with post-processing detected edges for live salient contour generation and preview can be significantly improved. More particularly, by employing a combination of common and/or modified image filters, as will be described, smooth salient contour generation and a flicker-free live presentation thereof can be provided.

Further, such real-time salient contour generation can be performed by a mobile device having a digital camera or image capturing device. In contrast to analog cameras, where optical viewfinders are employed by users to view live optical inputs (i.e., the scenery) from a camera lens prior to capture, digital cameras process live optical inputs, similarly received from a lens, as live video feeds for presentation to users on digital viewfinders (e.g., digital displays). More specifically, the live optical inputs are processed as live video feeds and displayed as continuous individual frames generally produced at a predefined frame rate. The live optical inputs are received through an optical lens of the digital camera and are processed as individual frames and continuously displayed at a frame rate perceived by the human eye as a live, continuous view of the composed frame. By employing a digital video framework, each frame of the live video feed can now be additionally processed through an edge-detecting filter to generate salient contours therefrom. The processed live video feeds can then be displayed to a user on the digital viewfinder to provide a live preview of salient contour generation. Utilization of modified edge-detecting filters and the digital video framework, as described in more detail herein, enable real-time processing and previewing of salient contours on mobile computing devices due to reduced processing power and/or memory.

As such, a designer can use a computing device with a digital camera, such as a smart phone, to view a real-time preview of salient contours within a live frame of a live video feed, thereby reducing or eliminating the unpredictability of traditional salient contour generation using a previously captured image. By previewing and adjusting the generation of salient contours in real-time, the user knows the precise outcome of the salient contour generation. The salient contours ultimately selected by the user can then be saved to a memory, such as a cloud-storage device, for storage or continued use in a design workflow.

In some instances, conditions of the live video feed environment can be less than ideal for edge-detection. In accordance with some embodiments described herein, a set of well-known image processing filters (e.g., histogram equalization) can be provided to enhance aspects of the image prior to processing a frame of the live video with the edge-detecting filter to further improve salient contour generation. In one example, objects in a frame of the live video can lack the contrast necessary for substantial edge-detection by an appropriate filter. As such, the intensity of the edge-detecting filter is not sufficient to detect the edges desired by the user. In accordance with embodiments described herein, a filter intensity control interface can be provided so that the user can adjust filter intensity while viewing the live preview of salient contours being generated.

In some other instances, providing a user with a variety of edge-detecting techniques may result in a variety of salient contours that are more preferable to the user. For example, an interpretation of an image by a first edge-detecting filter can result in salient contours that are different than an interpretation of the same image by a second edge-detecting filter. As such, when provided with a single edge-detecting filter, alternate methods may be employed for varying the filter's interpretations of the image, thereby providing the user with a selection of salient contours to choose from. In this regard, interpretations of an image can be varied in edge-detection, using a single filter, by tweaking characteristics of the image. Inverting the image (for instance, creating a negative thereof) can modify the image's edge information. As such, providing the user with an option to perform edge-detection to an inverted image, in addition to the unaltered image, can offer the user a low-cost solution to variable interpretations in edge-detection and salient contour generation. In accordance with embodiments described herein, the user is provided with an inversion control interface for inverting the live video feed for processing through the filter, such that different aspects of the live video feed are processed during edge-detection and salient contour generation.

Once the user captures a desired frame having a desirable salient contour set, in some cases, the captured frame may include undesirable portions or background noise. For example, if salient contours are generated for a potted flower sitting on a desk, it is possible that the edge of the desk, or a chair in the background, could show up as background noise that is undesirable to the user. As such, in some embodiments described herein, user selections can be received to include desired or undesired portions of the captured salient contours. For example, a captured frame including desired salient contours can be modified, based on user selections, to delete portions of the generated salient contours prior to saving. In some cases, the user can capture a desirable frame, but may notice that the generated salient contours are difficult to select due to problems like broken edges, interleaved duplicate edges, or incorrectly connected edges. As such, the user can be provided with the option to dispose of the generated salient contours corresponding to the captured frame and return to the live preview mode to capture a new set of salient contours.

In accordance with embodiments of the present invention, FIGS. 1A and 1B illustrate front and rear views, respectively, of an exemplary computerized system 100 that can be utilized to implement live previewing of salient contour generation associated with a live digital video feed. The computerized system 100 can be any device associated with a display screen 102 and an image capturing device 104, such as the computing device 1000 of FIG. 10. In embodiments, the computing device 100 includes an image processing system 107 for processing optical inputs provided by the image capturing device 104 and a salient contour generator 108 for implementing features of live salient contour generation, as will be described herein. In some embodiments, the computing device 100 is a portable or mobile device, such as a mobile phone, a personal digital assistant (PDA), a tablet, a video player, a laptop, or any other portable device associated with a display screen. In some implementations, the computing device 100, such as a portable device, includes the display screen 102 and image-capturing device 104. That is, a display screen and image-capturing device 104 are integrated or coupled with the portable device. In other implementations, a display screen and/or image capturing device is remote from, but in communication with, the computing device.

The display screen 102 is a screen or monitor that can visually present, display, or output information, such as, for example, drawings, sketches, images, text, figures, values, symbols, videos, video clips, movies, photographs, lists, data sets, webpages, emails, text messages, notifications, or any other content. The display screen 102 may be a touchscreen display, in accordance with embodiments described herein. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

As shown in FIG. 1, the exemplary computing device 100 includes a touch sensor(s) 106. A touch sensor(s) 106 may be any touch sensor(s) that detects contact or touch of an object with the touchscreen display 102 of the computing device 100. Such an object may be, for example, a user digit (e.g., a finger), a stylus, or another component that contacts a touchscreen display. A touch sensor(s) 106 may be any sensor suitable to detect an indication of touch, such as, for example, a capacitive sensor or a resistive sensor. As can be appreciated, any number of touch sensors may be utilized to detect contact with a touchscreen display.

In operation, a touch sensor detects contact of an object with at least a portion of a touchscreen display 102 of the computing device 100. A touch sensor may generate a signal based on contact with at least a portion of the touchscreen display 102 associated with the computing device 100. The signal generated by the touch sensor(s) may be communicated (e.g., directly or indirectly) to the salient contour generator 108, or other component, such that the salient contour generator 108 can facilitate user inputs, such as adjustments for salient contour edge detection and vector graphic conversion, as described in more detail below. Although the computing device 100 of FIG. 1 is described as a having a touchscreen display and image capturing device, as can be appreciated, computing devices without a touchscreen display or integrated image capturing device are contemplated as within the scope of embodiments described herein. In this regard, a point(s) selected via a mouse or other selecting device can be detected and used in accordance herewith to receive user inputs. Similarly, an external image capturing device can be used as an image capturing input device in accordance herewith.

The image capturing device 104 is a subcomponent of a digital camera feature typically found in a mobile computing device or smart phone. More specifically, the image capturing device 104 works in conjunction with the computing environment 100 and image processing system 107 to function as a digital camera. The digital camera feature, as described herein, can receive optical inputs from a composed frame of an optical lens 105, and process the inputs as a live video feed for presentation to a user on a digital viewfinder, such as on display screen 102. More specifically, the live video feeds are processed by the image processing system 107, interpreting the optical inputs as continuous individual frames. The image processing system 107 processes the optical inputs frame-by-frame and can further display the continuous individual frames at a frame rate perceived by the human eye as a live, continuous view of the composed frame. The image processing system 107 provides digital camera functionality and control on the mobile computing device. Typical digital camera functions such as image capture, video capture, digital viewfinder, etc., are provided for interfacing directly with a user or with other components of the computing environment 100. In some embodiments, the image processing system 107 may include advanced image capture aids to further improve image capture quality. Features may include, among other things, gyroscope-determined angle adjustments, image auto-rotation, auto exposure, and other image-adjusting features.

The salient contour generator 108 operates in the computing environment 100 and can interface with the image processing system 107. More specifically, the salient contour generator 108 can control and/or modify aspects of the image processing system 107. For example, the salient contour generator 108 can operate all digital camera functions of the image processing system 107. In addition, the salient contour generator 108 can, among other things, reference the live video feed from the digital viewfinder and process the live video feed, in real-time, using an edge-detecting filter. In this regard, the salient contour generator 108 can provide the user with real-time salient contour generation in accordance with the live video feed, as will be explained in more detail herein.

Turning now to FIG. 2, a block diagram is provided illustrating an exemplary salient contour generator 200, such as the salient contour generator 108 of FIG. 1A, in which some embodiments of the present invention may be employed. The salient contour generator 200 can operate in a computing environment as, among other things, a system application, standalone software application, firmware application, plug-in, or applet. The salient contour generator 200 is generally configured to enable real-time salient contour generation corresponding to a live frame of a live video feed, and present the salient contours as an overlay thereon as a preview prior to receiving an instruction to capture the presented salient contours. As described in more detail below, in one implementation, a live video feed is processed to generate salient contours on the frames presented therein. In this regard, the salient contour generator 200 can reference (e.g., receive, retrieve, obtain, access, etc.) a live video feed and process each frame of the live video feed through an edge-detecting filter to generate salient contours therefrom. The salient contour generator 200 can then present the generated salient contours as an overlay to each corresponding frame of the live video feed for the user to view in real-time. In another embodiment, the salient contour generator 200 can present the generated salient contours alone, yet in real-time, without a corresponding frame of the live video feed.

The salient contour generator 200 depicted in FIG. 2, in which some embodiments of the present invention may be employed, includes a video feed overlay component 202, a colorspace conversion component 204, an edge-detecting filter component 206, a salient contour capture component 208, a video feed inversion component 210, a filter adjustment component 212, a salient contour selection component 214, and a vector graphic conversion component 216. It should be understood that the salient contour generator 200 shown in FIG. 2 is an example of one suitable environment. It should be understood that this and other arrangements described herein are set forth only as examples. Other arrangements and components (e.g., machines, interfaces, functions, orders, groupings of functions, etc.) can be used in addition to or instead of those shown, and some components may be omitted altogether. Further, many of the components described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, the salient contour generator 200 can replicate the video feed using a video feed overlay component 202 to create at least two parallel processes working on identical video feeds in parallel. A first process can be used to convert a first video feed into greyscale using a colorspace conversion component 204, and a second process can be used for processing a second video feed through an edge-detecting filter component 206 for generating salient contours. The edge-detecting filter component 206 comprises a unique filter chain that, as will be described in more detail with reference to FIGS. 3-5, can achieve real-time, low noise, flicker-free artistic edge detection on a computing device, such as a mobile phone or tablet. The first and second video feeds can be recombined or blended using the video feed overlay component 202, such that the second video feed having the salient contours is presented on a display of the computing device as an overlay on the first video feed. Replicating the video feed into parallel processes, as described, can facilitate improved efficiency and low latency in salient contour generation and display on the live video feed. Parallel processes facilitate the ability to manipulate (i.e., convert to greyscale) the first video feed without interrupting complex processes related to edge-detection in the second video feed.

The salient contour generator 200 can also include a video feed inversion component 210 and a filter adjustment component 212, both of which can be used for the real-time modification of edge detection and salient contour generation. Edge-detecting filters (for instance, edge-detecting filters of edge-detecting filter component 206) can generally detect outlines and/or edges in images. In this regard, a user may see an artistic advantage to generating a salient contour based on a variation of image interpretations made by the edge-detecting filter. As previously discussed, different edge-detecting filters may interpret the same image differently and, as a result, lead to the generation of slightly different salient contours. A user may choose one edge-detecting filter over another, to suit his/her personal preference of the salient contours generated therefrom. However, when only provided with a single edge-detecting filter, different image interpretations can similarly be provided to the user by altering the image itself. For example, inverting an image, so as to create a negative thereof, can result in different edge-detection than the original image, when using a single edge-detecting filter. To this end, the video feed inversion component 210 can invert each frame of the live digital video feed prior to further processing (for instance, by edge-detecting filter component 206). In some embodiments, the video feed inversion component 210 can invert one or more video feeds received from the video feed overlay component 202 prior to processing through the edge-detecting filter component 206.

The filter adjustment component 212 can be used to adjust the intensity of the edge-detecting filter in real-time. For instance, certain objects and/or image capture conditions (i.e., lighting environment) can be less-than-optimal for generating desirable salient contours. As such, the filter adjustment component 212 can receive user inputs providing customizable parameters for adjusting filter detail intensity, thereby increasing or decreasing filter intensity and noise. In some embodiments, the customizable parameters provided by user inputs can adjust the amount of fill versus stroke used in salient contour generation. In more detail, one of ordinary skill in the art can appreciate that fill is the surface area of a shape, typically filled by a color or gradient defined by a user. Stroke, also generally appreciated by one of ordinary skill in the art, is the line defining the borders of the shape, having a thickness and color typically defined by a user. The amount of fill and stroke applied to a particular shape or design can be directly proportional to the amount of detail apparent in the shape or design itself. For instance, a hypotrochoid having a small stroke and a large fill will present details of all curvatures and intersections associated with the design. The same design, when presented with a large stroke and small fill, will take away from most of the apparent details. As such, the amount of fill versus stroke is directly proportional to the level of detail shown in the salient contours.

Generally, a user indicates when to capture a particular frame of the live digital video feed having a desirable set of salient contours presented thereon. For instance, a user may move the distance and angle of the image-capturing device to find an optimal perspective or condition to produce the salient contours desired for the design workflow. As such, upon seeing a desired set of salient contours generated from the live video feed, the user can send an input to control interfaces of the computing device for capturing the set of salient contours presented on the displayed frame (for instance, using the image processing system 107). In some embodiments, a salient contour capture component 208 is employed to capture only the salient contours from the frame in which the desired set of salient contours was presented.

The salient contour generator 200 can further include a salient contour selection component 214 that provides the user with a post-capture opportunity to remove noise and/or undesirable objects that were detected and appear as salient contours within the captured frame. For example, a user may want to capture the graphic design appearing on a coffee cup, but does not want to capture the outline of the cup itself. As such, if the captured salient contours in the frame included the desired design and an outline of the coffee cup, the user can use the salient contour selection component 214 to remove or deselect portions of the captured set of salient contours. Embodiments can also include a salient contour selection component 214 that further provides the opportunity to add portions that appear as salient contours within the captured frame. For example, a user may be presented with a representation of all salient contours generated within the frame and, by providing an input, can select portions of the salient contours desired for capturing. In another example, a combination of various inputs selecting and/or deselecting portions of the salient contours can be provided by the user to the salient contour selection component 214.

To that end, a user input (e.g., touch input, mouse click, and area selection) can be received to indicate a desired selection of at least a portion of the captured set of salient contours. To save the desired salient contours, a vector graphic conversion component 216 is included for converting the desired selection of captured salient contours to a vector graphic format that is usable in leading design products like Adobe® Photoshop® and Adobe® Illustrator®. The vector graphic can then be saved locally and/or remotely, for instance, on a cloud-storage device like Adobe's Creative Cloud®.

Figure 3:
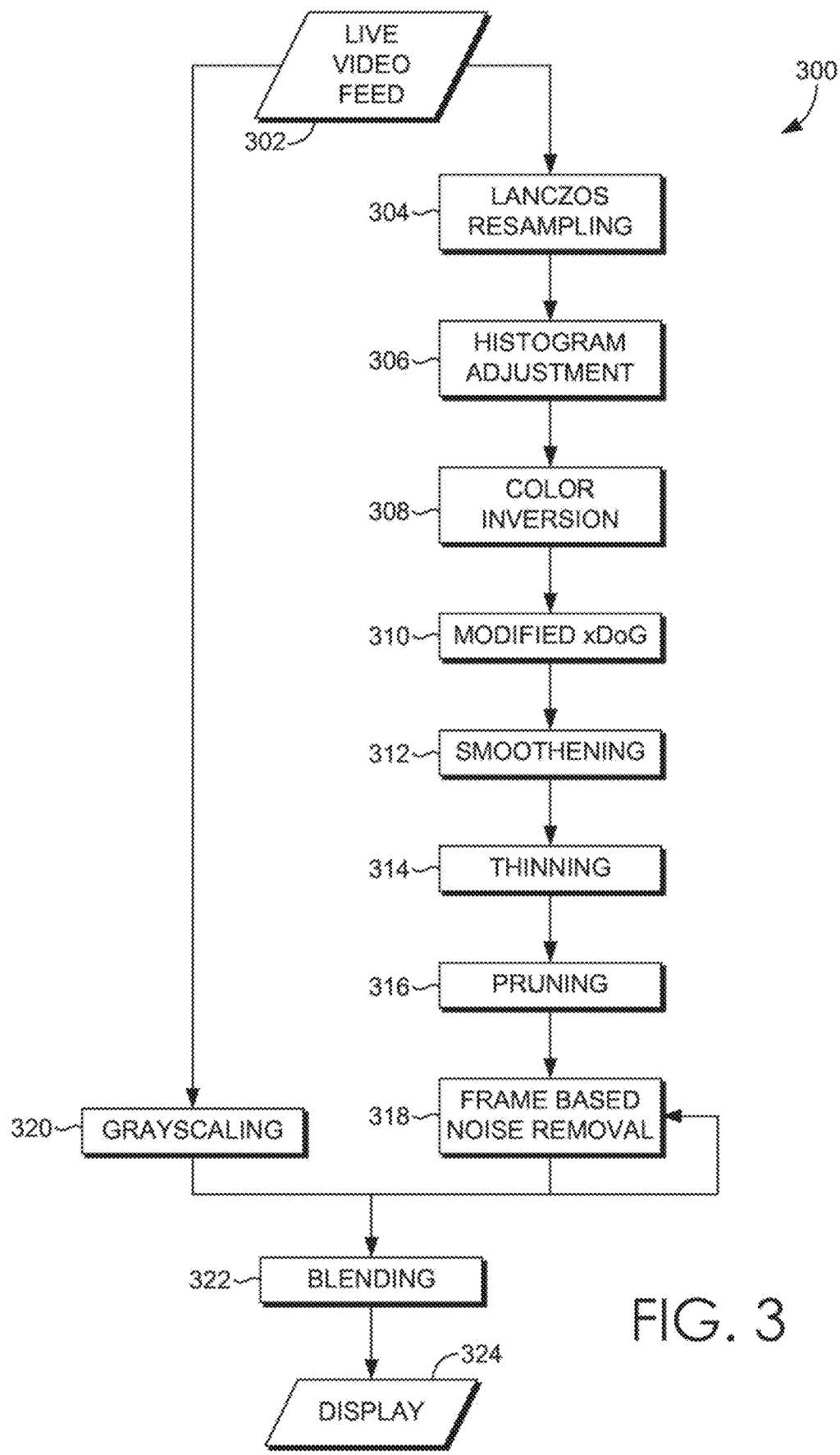
FIG. 3 is a flow diagram showing a method for facilitating live previews of salient contours associated with a live digital video feed, in accordance with embodiments of the present invention.

As described above, some embodiments of the salient contour generator 200 can replicate the digital video feed using a video feed overlay component 202 to create at least two parallel processes working on identical video feeds in parallel. Turning now to FIG. 3, a flow diagram is provided to illustrate steps of a method 300 for facilitating live previews of salient contours associated with a live digital video feed, in accordance with an embodiment of the present invention. Initially, as shown at block 302, a live digital video feed is received for processing, for instance, by salient contour generator 200 of FIG. 2. The live video feed can be split into a first live video feed layer and a second live video feed layer, each handled by at least one parallel process. As previously described, digital video feeds are comprised of a plurality of individual frames, each which must be individually processed prior to display at a predetermined frame rate. In this regard, the first and second live video feed layers both process each frame of the live video feed layers prior to display at the predetermined frame rate. A first process on the first live video feed layer can perform a chain of filters for edge-detection and salient contour generation with low noise and flicker-free smooth artistic edges. The first process of the filter chain can begin at block 304, illustrating a downsampling step, such as Lanczos resampling. Details describing features and integration of downsampling, including Lanczos resampling, is commonly known in the art and will not be described further herein. It can be appreciated that, among other downsampling methods, standard GPU downsampling steps can be performed for the integration of downsampling at block 304.

In some embodiments, a histogram adjustment 306 can be performed automatically or manually by a user on the resampled output for adjustment of contrast in the first live video feed layer. Histograms are generally known in the art as graphical representations of the tonal distribution in an image, wherein the number of pixels for each tonal value are plotted on a horizontal axis. Histogram adjustment can potentially improve image or video frame interpretation by edge-detecting filters. Some embodiments of the present invention can provide manual adjustment of the tonal values by presenting a user interface on the histogram, whereby the user interface provides input controls for adjusting the tonal values of each pixel. Some other embodiments can provide for the automatic adjustment of the tonal values by processing the tonal values through complex algorithms for achieving optimal image contrast for edge-detection.

In embodiments, a color inversion 308 can also be performed, for instance, by video feed inversion component 210 of FIG. 2, on the first live video feed layer. The color inversion 308 can also be automatically performed by the system or manually initiated by the user for adjustment of salient contours ultimately selected by the user. Color inversion is described herein as inverting all pixel colors and brightness values (e.g., a negative) in an image or frame of a video feed. As described above, color inversion can performed on images or frames of video feeds for providing alternative image interpretations for edge-detection. Some embodiments of the present invention can provide manual initiation of a color inversion of the video feed or instances thereof. For instance, user interfaces can be provided, having input controls for initiating processes that invert colors of each frame of the video feed. Other embodiments can provide for the automatic color inversion of the video feed or instances thereof, when algorithms attempt to determine an optimal configuration for edge-detection of the video feed.

The first live video feed layer is then processed through a modified eXtended Difference-of-Gaussians ("xDoG") filter 310, as will be described in more detail herein with respect to FIG. 5. The traditional xDoG filter is commonly known to one of ordinary skill in the art and, as one of ordinary skill may appreciate, the traditional xDoG filter is generally not capable of processing edge-detection in real-time, particularly on mobile computing devices, due to float data-type (i.e., values with potential decimal places) constraints. As previously discussed, mobile computing devices are not typically optimized for processing complex float data-type calculations. The modified xDoG filter 310, however, is configured to convert all float data-types, typically processed by the traditional xDoG filter, into the integer data-type for real-time filtering compatibility on mobile devices, such as smart phones or tablets.

Once processed through the modified xDoG filter, the first live video feed layer is processed through a noise-reducing combination of filters, including smoothening 312, thinning 314, and pruning 316 filters, each configured to reduce noise and flickering. As one of ordinary skill in the art may appreciate, traditional noise-reducing techniques include open/close filters. In more detail, open/close filters are typically made up of two steps including dilation followed by erosion. Dilation, on one hand, is the process of checking every neighbor pixel and, if any neighbor is white, the pixel in question is set to white. Erosion, on the other hand, is in essence, the same as dilation, but performed against black pixels. Open/close filtering methodologies, however, are too binary and can lead to excessive noise and flickering.

To that end, the noise and flickering typically associated with open/close filters can be significantly reduced by employing an alternative to the open/close filter. By processing the output from the modified xDoG with a plurality of filters configured to collectively preserve color gradient information along detected edges, as will be described, salient contour generation can be presented as a live preview with minimal concern of noise and flickering. For example, instead of employing the traditional first step of dilation on the output from the modified xDoG step 310, the output can be processed through a smoothening step 312, which can include, among other things, a Gaussian blur filter. The Gaussian blur filter, in the broadest sense, as one of ordinary skill in the art may appreciate, blurs image information by a Gaussian function. Gaussian blur is typically used to reduce image noise and reduce detail, generally. In this regard, Gaussian blur filters are particularly helpful in smoothening sharp edges within images and reducing fall-off of information near these edges. By employing the Gaussian blur filter, sharp lines and edges in images are given a gradual fall-off, so that high contrasting aspects of an image are smoothened and edges are given a perceived weight. For instance, a close-up image of eyelashes processed through an edge-detecting filter and subsequently processed using open/close filters may result in a plurality of thin, pixelated lines over each eyelash. The lack of detail and pixilation is a result of the binary nature of open/close filters (i.e., there is an edge or there isn't an edge). However, provided that the image is first processed through a Gaussian blur following the edge detection, the lines are given a perceived thickness or "weight." The Gaussian blur provides additional information to each edge provided thereto. Instead of abruptly removing information, the Gaussian blur provides additional pixel information by creating progressive color gradients near each edge. In the same context, assuming multiple lines were immediately adjacent to one other, to maintain a smooth rendering of edges throughout and reduce noise, it may be preferable that the multiple lines appear as a single thick line. A Gaussian blur can obscure the delineated nature of the adjacent lines to provide a smoother rendering of edges while reducing undesirable noise. As one of ordinary skill in the art may appreciate, the Gaussian blur can be employed to reduce image noise by generally obscuring delineation of irrelevant details throughout an image.

The output from the smoothening step 312 can then processed by an alternative to the traditional second step of erosion, herein replaced by the thinning step 314. The thinning step 314 may include one or more filters including, among other things, a modified threshold filter. The threshold filter is traditionally employed to convert greyscale images to binary images (i.e., black and white), as one of ordinary skill in the art may appreciate. In some aspects, threshold filters are employed to replace pixels in an image with a black pixel if the image intensity is less than some fixed constant, or a white pixel if the image intensity is greater than that constant. In accordance with embodiments described herein, the thinning step includes a modified threshold filter to intensify greyscale image pixels closer to black or white, as opposed to converting the image into a binary black or white image. For example, if the gradient between black and white was described as 0 (black) to 1 (white), a traditional threshold filter may set a fixed constant of 0.5 to determine that pixels in a greyscale image having a value between 0 to 0.5 are converted to black, while pixels having a value between 0.5 to 1 are converted to white. As can be appreciated, the traditional threshold filter polarizes the color values of the pixels to generate a purely black and white ("binary") image. In a modified threshold filter, however, the pixels are not converted to these binary black and white values, but instead pushed towards these polarized ends to intensify the contrast of the pixel color values while retaining some fall-off edge information. To this end, defined edges typically having a 0 value can still include fall-off information to provide a perception of smoothness, weight and/or thickness thereto. For example, pixels having a color value between 0 to 0.5 may be pushed to 0 to 0.2, while pixels having a color value between 0.5 to 1 may be pushed to 0.8 to 1. While this example is only an example and not intended to be limiting, it is considered that any configuration of fixed constants and threshold values may be employed in embodiments of the present invention. As one of ordinary skill in the art may appreciate, the steps of smoothening and thinning a salient contour, as opposed to employing steps of dilating and eroding neighboring pixels thereof, can provide for reduced noise and flickering, while maintaining the generation of smooth, weighted salient contours. The utilization of gradient information, instead of a traditional binary configuration, can significantly reduce or eliminate noise and flickering in live salient contour generation.

Figure 4B:
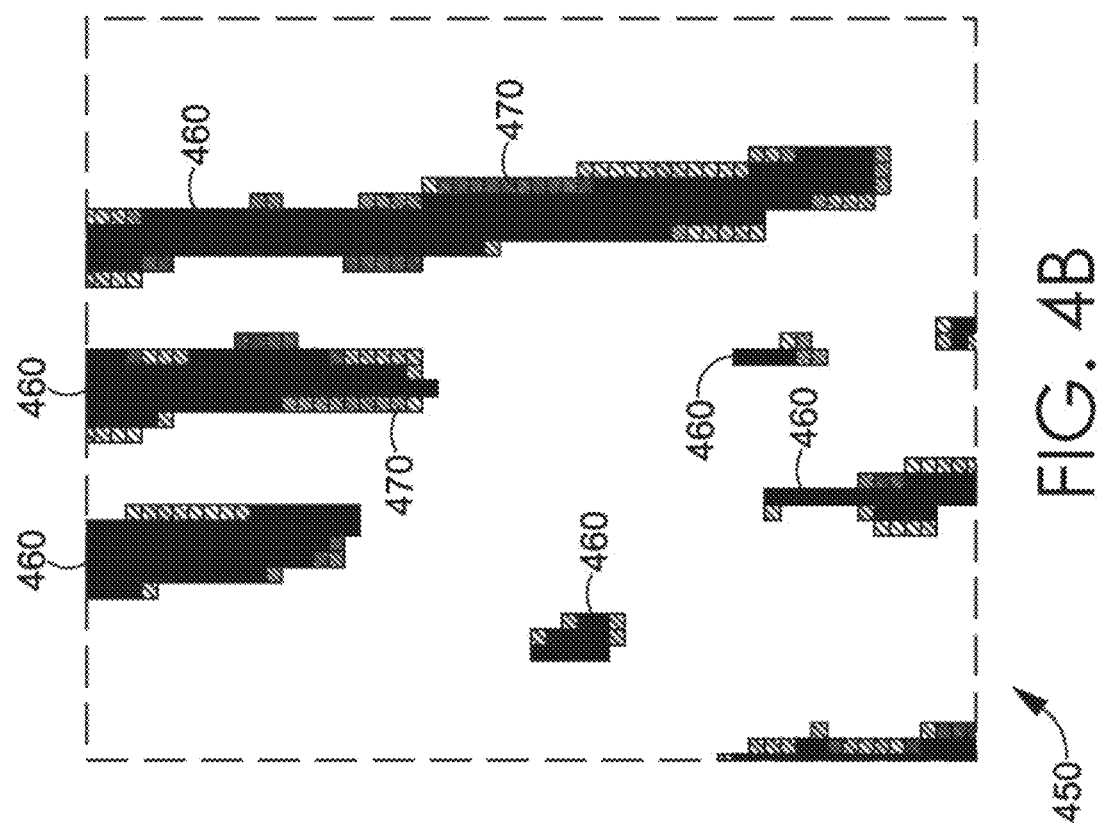
FIG. 4B is an enlarged view of the screenshot of FIG. 4A, particularly illustrating the pixels along the edges.
Figure 4A:
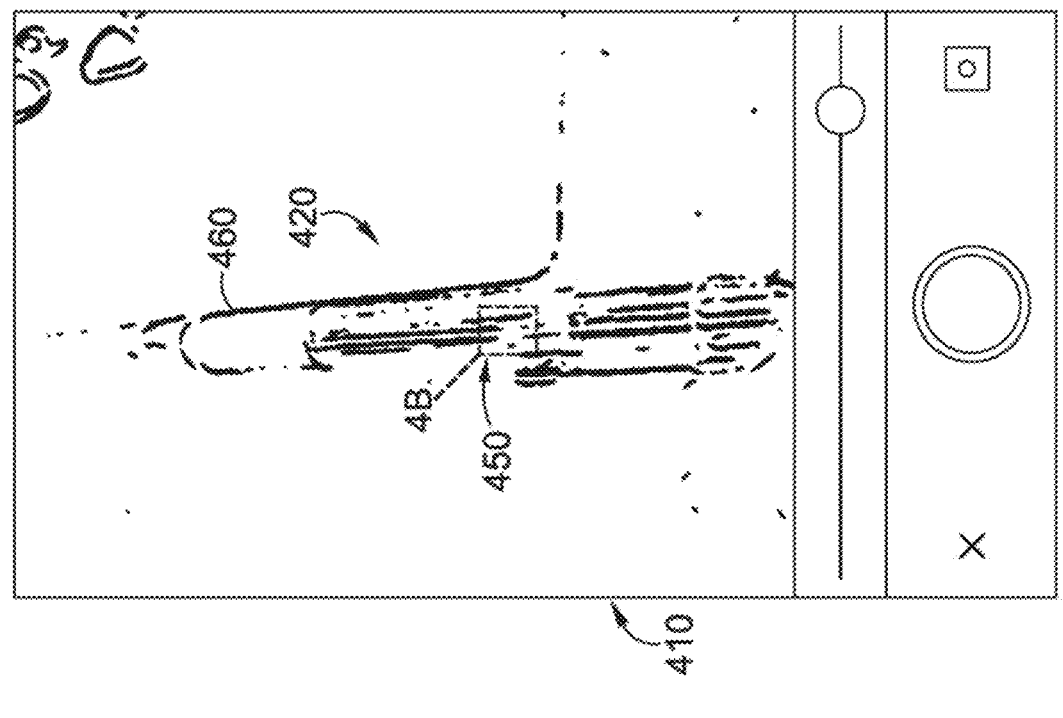
FIG. 4A is a screenshot of an exemplary preview of salient contours generated in accordance with embodiments described herein.

With brief reference to FIGS. 4A-4B, a screenshot of an exemplary salient contour generation preview is illustrated in accordance with embodiments described herein. A screenshot 400 is provided to illustrate a preview of salient contour generation incorporating at least a smoothening step 312 and a thinning step 314, as described herein. The screenshot 400 illustrates a frame 410 of a live digital video feed displaying salient contours 420 of an object within the frame 410 of the live digital video feed. The salient contours 420 have a weighted appearance that help bring out accents of the object and further provide an artistic rendering of the object. FIG. 4B is a zoomed-in portion 450 of the salient contours 420 illustrated in FIG. 4A. The zoomed-in portion 450 illustrates details of the pixels that draw the edges 460 of the salient contour generation preview. The zoomed-in portion 450 includes the object edges 460 each having fall-off information 470 (e.g., color and/or greyscale values) that are preserved by the smoothening and thinning steps 312, 314. As described above, the smoothening and thinning steps 312, 314 preserve gradient fall-off information along the edges 460 when generating salient contour previews in live video applications. As opposed to edges having either a binary black or white value with no fall-off information, which is typically the case with traditional open/close filters, the edges generated by embodiments described herein preserve at least some gradient information corresponding to at least some pixels adjacent to the edges to reduce or eliminate flickering and noise when rendering salient contour previews in live video applications.

Referencing back now to FIG. 3, additional pruning 316 can also be performed on the output of step 314, following the aforementioned noise-reducing steps. Pruning may incorporate various filters or methodologies for efficiently trimming away edges of the output of step 314. Pruning 316 may employ features similar to the traditional open/close filters, as described above, to formalize the salient contours presented using the smoothening 312 and thinning 314 steps. In essence, pruning can be performed to create a binary form of the output provided by the thinning step 314. In some embodiments, a frame-based noise removal step, shown at 318, can be performed for providing additional noise removal on the first live video feed layer. The frame-based noise removal step employ filters or other well-known methodologies for removing detected noise throughout an entire frame of the live video feed. Although not illustrated, it is considered within the scope of the present invention to include any additional noise-reducing steps to further refine the output processed by the aforementioned filter chain performed on the first live video feed layer. The aforementioned steps are only considered as one example of the noise and/or flicker-reducing methods employed by the present invention. Other embodiments may include any aforementioned step or combination thereof, while also employing additional steps not disclosed herein, to achieve improved noise and/or flicker reduction in live salient contour generation.

Referring back to the live video feed 302, a second process on the second live video feed layer can convert the second live video feed layer into a greyscale colorspace using, for instance, colorspace conversion component 204 of FIG. 2. The conversion to greyscale can improve live video frame rates with reduced processing requirements during blending and display, as will be described. In some instances, generated salient contours can be converted to a bright, solid color. In this regard, presentation of generated salient contours using a bright, solid color, overlaid onto a corresponding greyscale live video feed, can provide clear contrast and improved visibility of the generated salient contours thereon. Although greyscaling is described in embodiments herein to facilitate improved contrast between salient contours overlaid onto the live video feed, it is considered within the scope of the invention to appreciate other techniques for displaying the salient contour and live video feed combination to obtain clear visibility and contrast there between. For example, techniques may include red salient contours on an unaltered live video feed, inversion of live video feed colors only on areas covered by the salient contours, darkening of the live video feed with high contrasting salient contours on the overlay, and others.

To that end, the greyscale video output from step 320 and salient contours detected from filter chain including steps 304-318, are combined in blending step 322. The blending can be performed by, for example, video feed overlay component 202 of FIG. 2, and include any process of combining parallel video feeds, as can be appreciated by one of ordinary skill in the art. Once the first live video feed layer and second live video feed layer are blended, the output is presented on a display at step 324 for additional customization, selection, and processing, as described herein.

Figure 5:
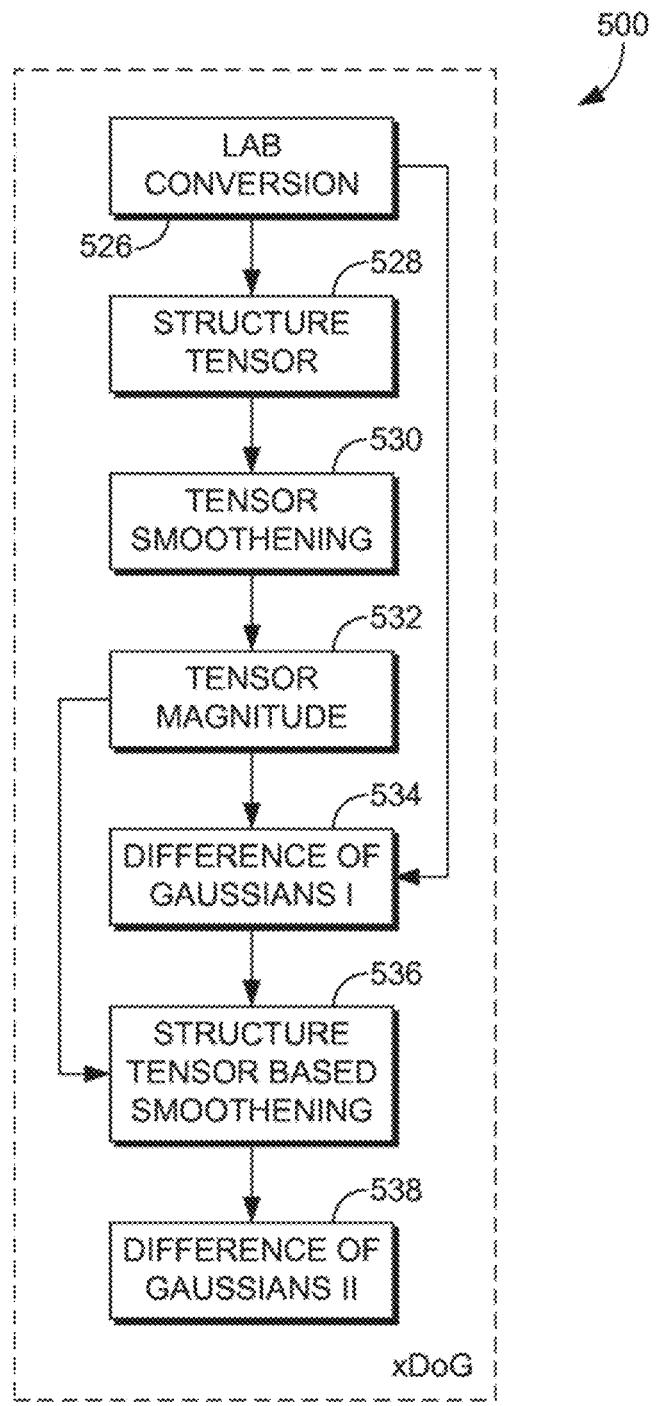
FIG. 5 is a flow diagram illustrating components of a filter chain utilized in facilitating live previews of salient contours associated with a live digital video feed, in accordance with embodiments of the present invention.

Turning now to FIG. 5, a flow diagram is provided that illustrates components of a filter chain including filter steps for facilitating live previews of salient contours associated with a live digital video feed. More particularly, the components of the filter chain are steps included in the modified eXtended Difference-of-Gaussians ("xDoG") filter as described in step 310 of FIG. 3, and also in accordance with embodiments of the present invention. The traditional xDoG filter is typically used as an edge-detecting filter that is less susceptible to noise and increased aesthetic appeal and, as such, is popular in edge-detecting applications. A shortcoming of the traditional xDoG filter, however, is that the algorithms associated therewith, used for processing the image, are limited to use of the float data-type. This particular shortcoming makes use of the traditional xDoG filter unsuitable for mobile computing applications, as mobile processors are not suitable for processing multiple complex float data-types in real-time. As described in step 310 of FIG. 3, the modified xDoG filter is configured to convert all float data-types typically used by the traditional xDoG filter into the integer data-type for simplified processing and general compatibility with mobile computing devices (e.g., smart phones and tablets).

All steps described herein are directed to processing at least one frame of a live video feed and/or a static image utilizing the modified xDoG filter. The modified xDoG filter illustrated in the provided diagram describes one example of the modified xDoG filter comprising a filter chain 500 and is not intended to be limiting, as other embodiments can be considered for use with the present invention. The modified xDoG filter, comprising filter chain 500, is configured to receive an input including a live video feed, frames of a live video feed, or instances thereof. As described, the modified xDoG filter is configured to modify all calculations performed therein using an integer data-type. Though many of the traditional xDoG filter steps are retained herewith, modifications are employed as will be described. The filter chain 500 includes a Lab Conversion step 526, a Structure Tensor step 528, a Tensor Smoothening step 530, a Tensor Magnitude step 532, a Difference of Gaussians I step, a Structure Tensor-based Smoothening step 536, and a Difference of Gaussians II step 538. The above-listed filtering steps 526-538 are generally known in the art as individual processes and, as such, details of each filter will not be described herein. The filtering steps 526-538 as a filter chain 500, however, are not known and are illustrated herewith in conjunction with the modified xDoG filter. As illustrated, the filter chain is 500 generally sequential in order. However, outputs from filters within the chain can be additionally communicated to other steps in a non-sequential order, for example, outputs from Lab Conversion 526 to Difference of Gaussians I 534, or outputs from Tensor Magnitude 532 to Structure Tensor-based Smoothening 536 are considered herein.

With regards to the float data-type to integer data-type modifications, aspects of the modified xDoG filter can significantly affect smoothness of the output generated therefrom. In order to retain smoothness despite the integer modifications, the Structure Tensor-based Smoothening step 536 and Difference of Gaussians II step 538 can be merged together as a single step to eliminate data loss in a transfer of lower-precision integers across these phases. In addition, the outputs from steps 526, 530, and 532 may be split across multiple channels to provide a greater range than is feasible by using a single channel in the RGBA GPU filter pipeline. Although illustrated in the described order, the order is not to be limiting and only described to illustrate one embodiment of the present invention. As such, any order, combination, or steps between the aforementioned steps in the filter chain 500 can be considered for use in the present invention.

Figures 6, 7:
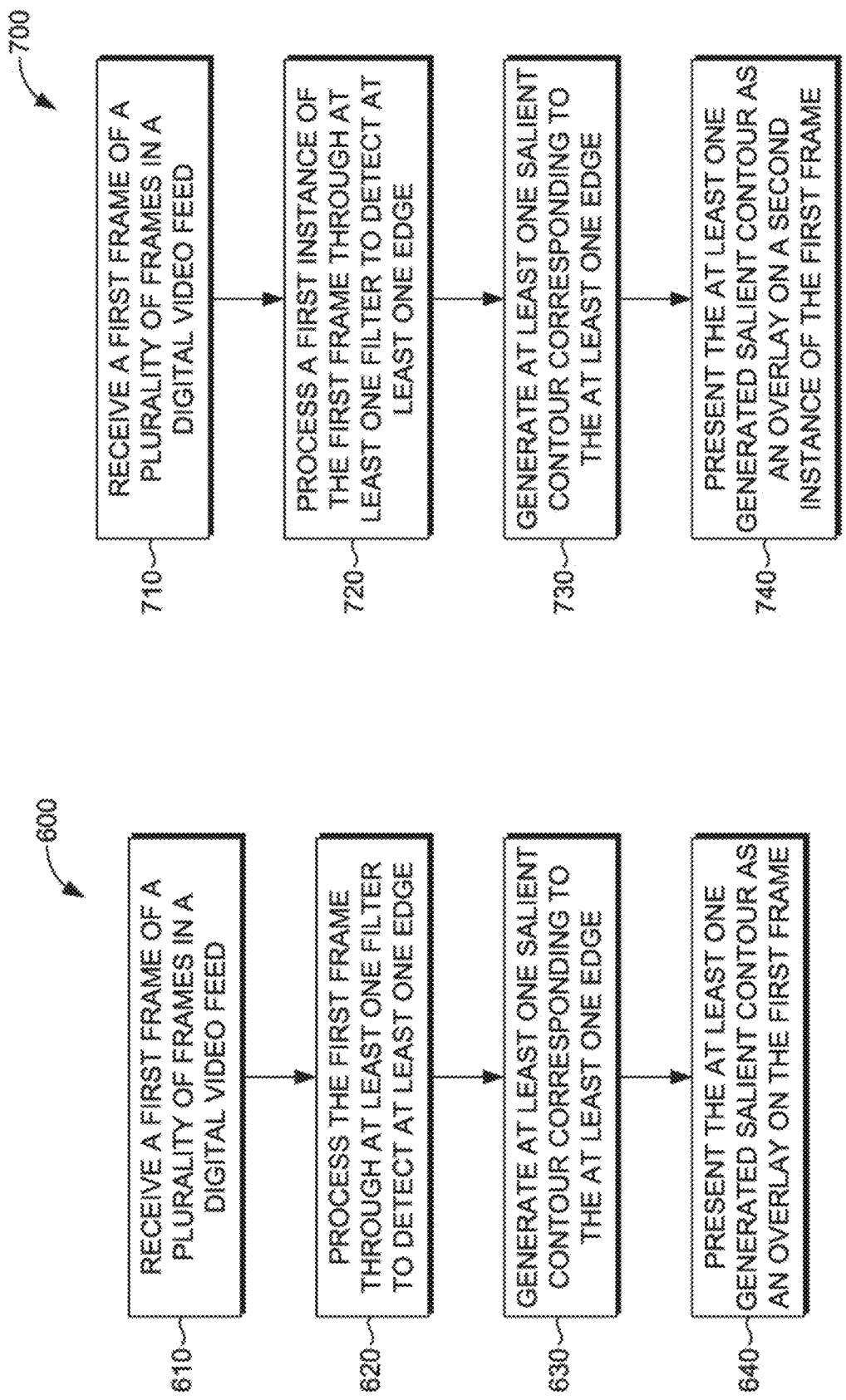
FIG. 6 is a flow diagram showing an exemplary method for providing a live preview of salient contours associated with a live digital video feed, in accordance with embodiments described herein.
FIG. 7 is a flow diagram showing another exemplary method for providing a live preview of salient contours associated with a live digital video feed, in accordance with embodiments described herein.

Turning now to FIG. 6, a flow diagram is provided that illustrates a method 600 for providing a live preview of salient contours associated with a live digital video feed. Initially, at block 610, a first frame of a plurality of frames in a digital video feed is received. At block 620, the first frame is processed through at least one edge-detecting filter. The edge-detecting filter is employed to detect at least one edge appearing within the first frame. At block 630, at least one salient contour is generated corresponding to the at least one edge detected within the first frame. At block 640, the at least one generated salient contour is presented as an overlay on the first frame. The presenting of the at least one generated salient contour as an overlay is performed sequentially after but substantially concurrently with the step of receiving the first frame at block 610 to provide what appears to be a live preview of salient contours on the digital video feed.

Turning now to FIG. 7, a flow diagram is provided that illustrates another method 700 for providing a live preview of salient contours associated with a live digital video feed. At block 710, a first frame of a plurality of frames in a digital video feed is received. A first instance of the first frame is processed, at block 720, through at least one edge-detecting filter. The at least one edge-detecting filter is configured to detect at least one edge appearing within the first frame. At block 730, at least one salient contour is generated. The at least one generated salient contour corresponds to the at least one edge detected within the first instance of the first frame. At block 740, the at least one generated salient contour is presented as an overlay on a second instance of the first frame substantially concurrently with the receiving of the first frame. The second instance of the first frame might be a converted greyscale version of the first frame.

Figure 8:
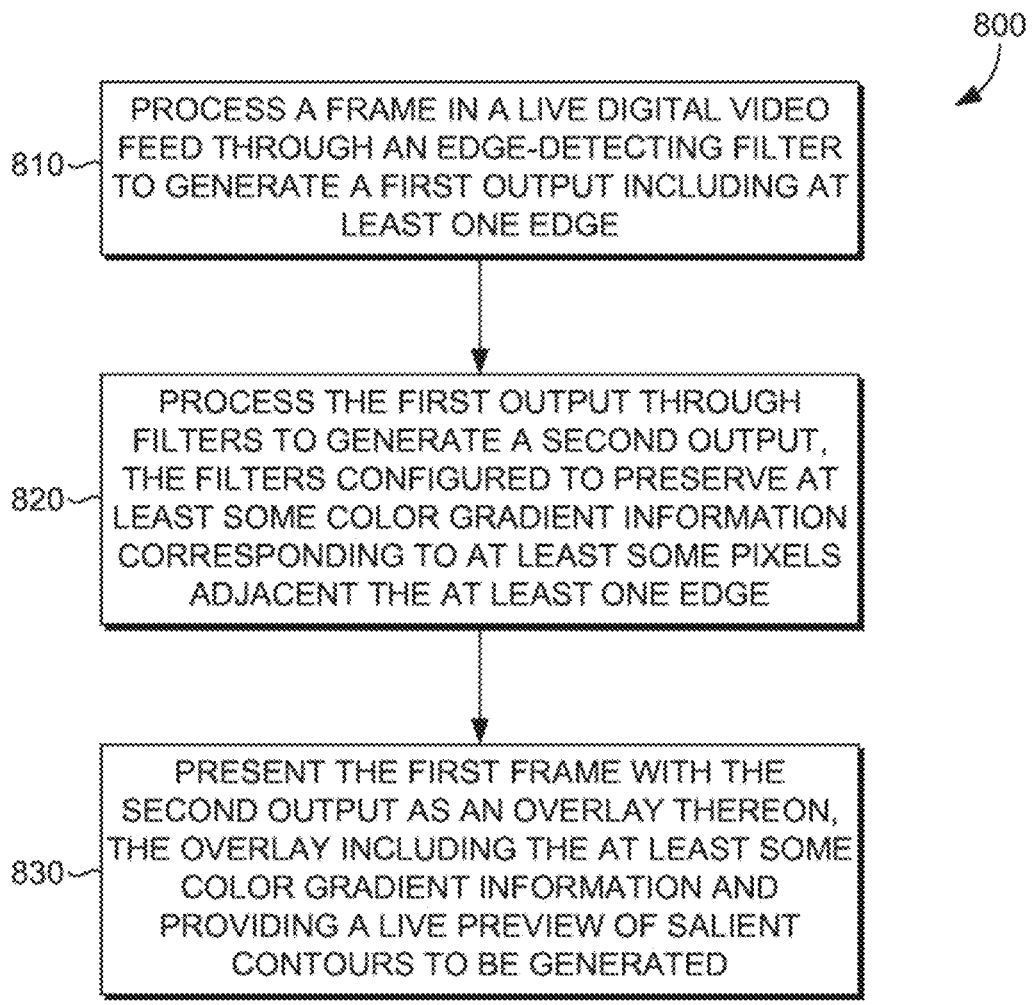
FIG. 8 is a flow diagram showing an exemplary method for facilitating live previews of salient contours associated with a live digital video feed, in accordance with embodiments described herein.

Turning now to FIG. 8, a flow diagram is provided that illustrates a method for facilitating live previews of salient contours associated with a live digital video feed. At block 810, a frame in a live digital video feed is processed through an edge-detecting filter. The edge-detecting filter is configured to generate a first output including at least one edge. At block 820, the first output is processed through one or more filters to generate a second output. The one or more filters are configured to preserve at least some color gradient information corresponding to at least some pixels adjacent the at least one edge. In some embodiments, the color gradient information can be greyscale gradient information. At block 830, the first frame is presented with the second output overlaid on top of the first frame. The overlay includes at least some of the color gradient information and provides a live preview of salient contours to be generated.

With reference now to FIGS. 9A-9D, exemplary user interfaces are provided that illustrate steps in a workflow for providing live previews of salient contours associated with a live digital video feed, in accordance with embodiments of the present invention. These are only examples and are not intended to limit the scope of embodiments of the present invention. Initially, referencing now FIG. 9A, in a first step 900, a user may view salient contours 902 generated and presented over a live greyscale video feed 904. In addition to the salient contours 902 generated and presented as an overlay on the live greyscale video feed 904, a number of input control user interfaces are also presented. In embodiments, a video feed inversion control 906 can be presented, which can, when toggled, initiate an inversion of a video feed using video feed inversion component 210 of FIG. 2. Initiation of the video feed inversion component 210 inverts the video feed for processing through the edge-detecting filter component 206 of FIG. 2. The video feed inversion control 906 can invert the video feed for the edge-detecting filtering layer, such that the greyscale video feed 904 remains unmodified.

Embodiments can also include a filter intensity parameter control 908 that can be presented in the form of a slider or other adjustable interface. The filter intensity parameter control 908 can, when adjusted, change detail intensity parameters in the edge-detecting filter chain for increasing or decreasing filter intensity and detected noise 909, as described above with respect to filter adjustment component 212 of FIG. 2. Alternatively, the filter intensity parameter control 908 can be used for adjusting the level of detail in the image or for using color thresholding to provide the degree of fills desired by a user in the event thin contours (e.g., hair on a head) need to have a fill color.

In embodiments, a salient contour capture control 910 is presented as a circular input control interface, similar to that of an image capture input control typically found on an image capture application. The salient contour capture control 906 can trigger the capturing of a particular frame of the live video feed having a desirable set of salient contours presented thereon using, for instance, salient contour capture component 208 of FIG. 2.

Figure 9B:
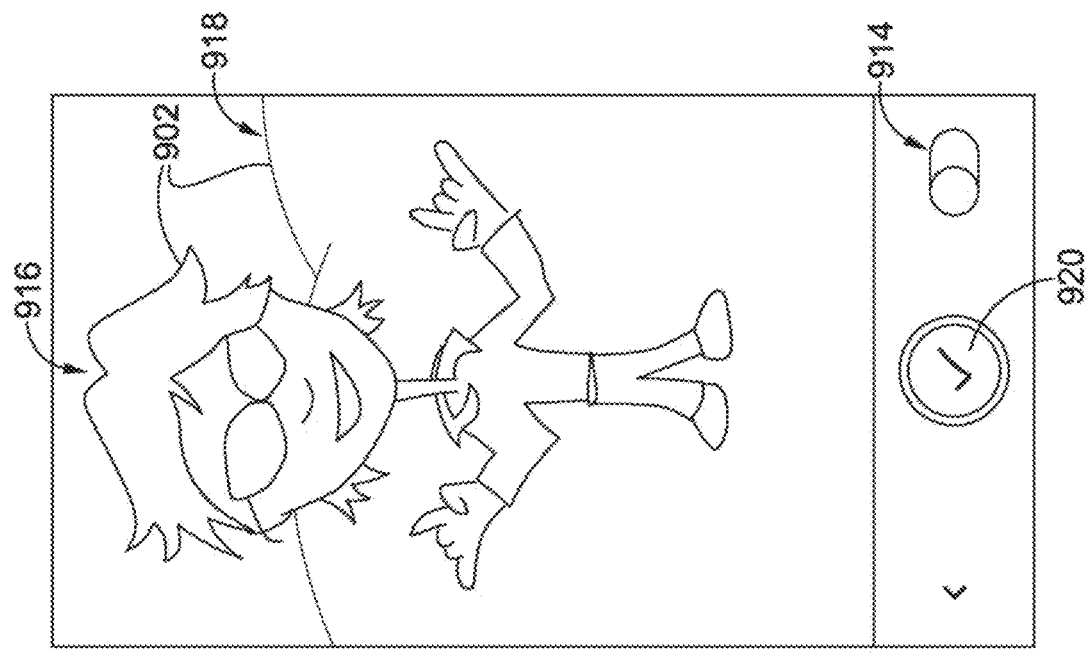
FIGS. 9A-9D are exemplary user interfaces illustrating steps in a workflow facilitating live previews of salient contours associated with a live digital video feed, in accordance with embodiments of the present invention.
Figure 9A:
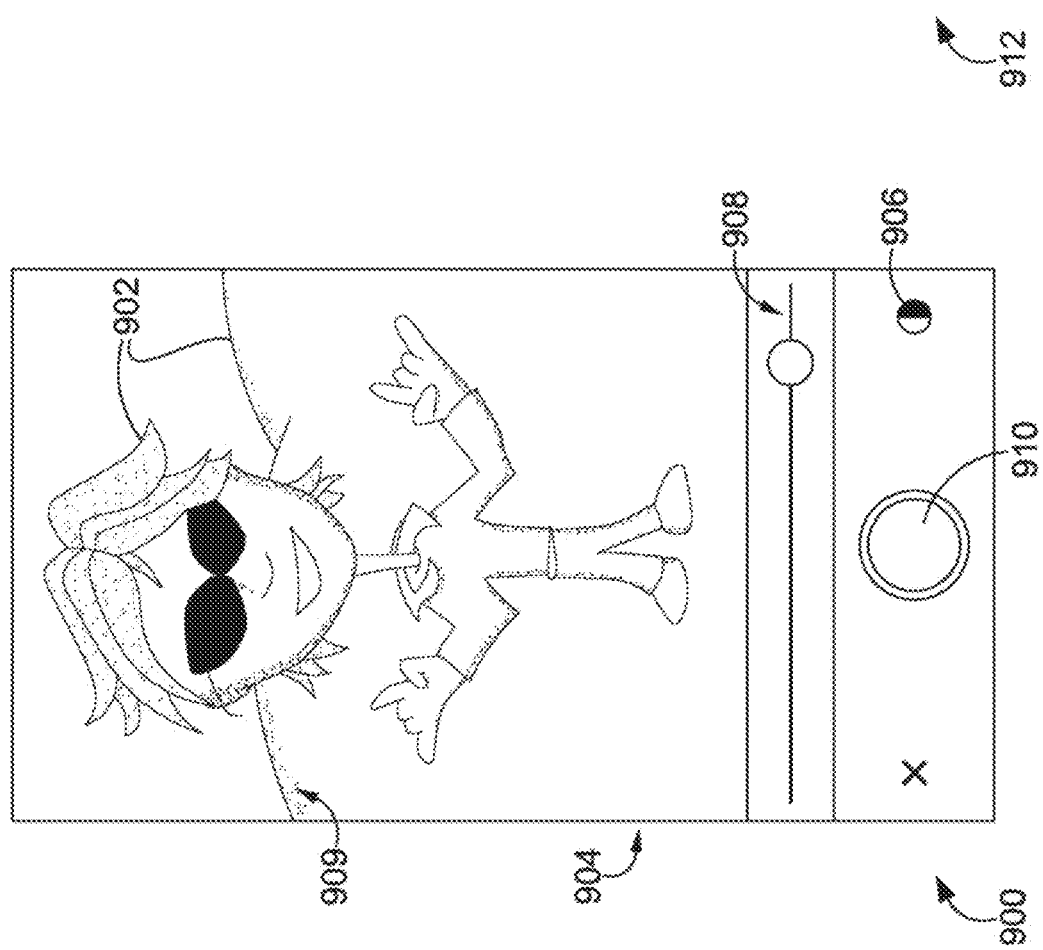

Now assume that a user selected to capture a set of salient contours. Looking now to FIG. 9B, illustrating an exemplary user interface of a second step 912, a display is presented comprising the captured salient contours 902 detected and generated in step 900 of FIG. 9A. As illustrated, any undesirable noise 909 from FIG. 9A is left undetected as only the salient contours 902 are presented on the display, while the live video feed 904 is also no longer presented after capturing. In the illustrated embodiment, a salient contour selection toggle 914 is presented for toggling inclusion or exclusion commands of the salient contour selection component 214 of FIG. 2. For example, in a first state, the salient contour selection toggle 914 can provide for the inclusion of all user-selected contours in a final conversion step, as will be described herein. In a second state, the salient contour selection toggle 914 can provide for the exclusion of all user-selected contours in the final conversion step. For example, the salient contours 902 of FIG. 9B illustrate a man 916 standing in front of a landscape 918. If, for example, a user was only interested in the salient contours of the man 916, and not those of the landscape 918, the user could toggle the second state of the salient contour selection toggle 914 and select (i.e., by touch or other input methods) the contours of the landscape 918 for exclusion from the final capture. To that end, once a desired set of salient contours are presented on the display, as selected, a final selection input control 920 will capture the selected salient contours 902 for further processing, as will be described.

Figure 9D:
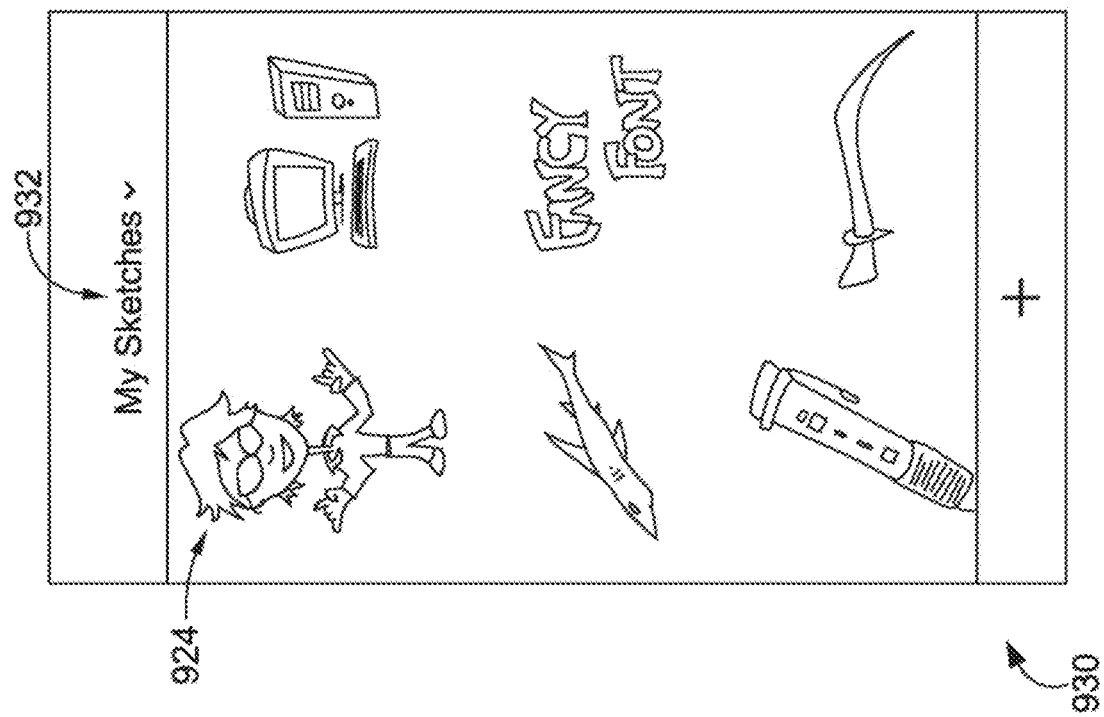
Figure 9C:
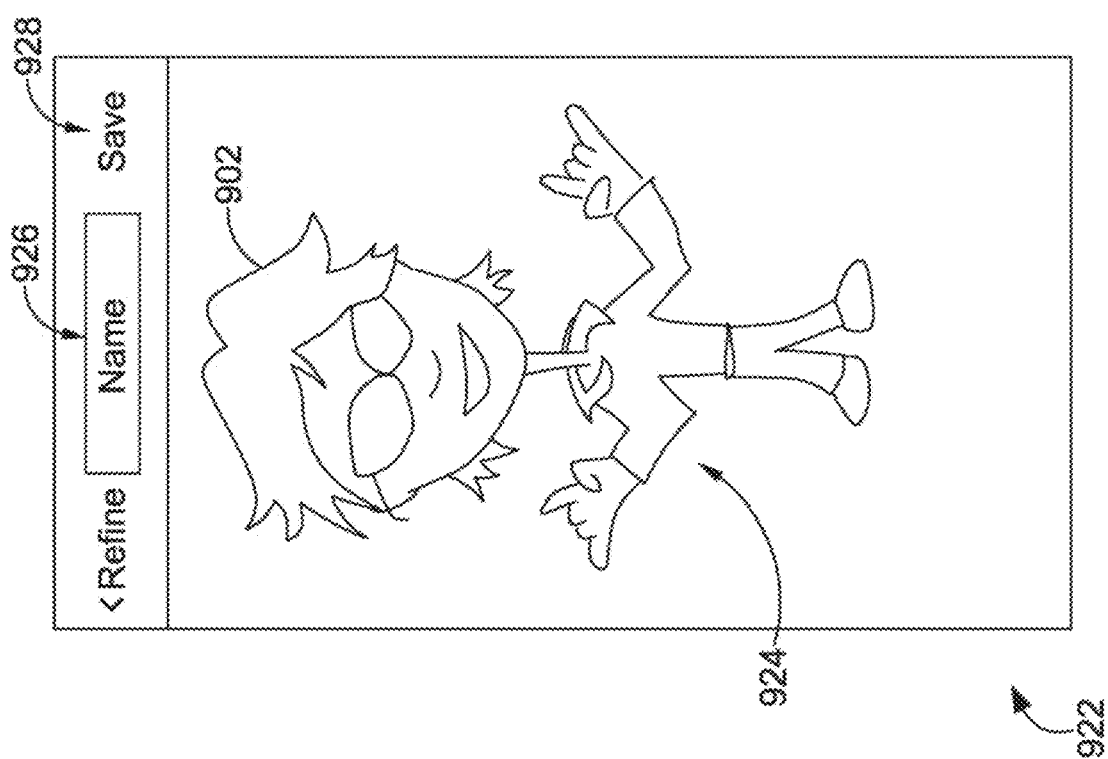

Once the desired set of salient contours 902 is captured, the set 902 can be converted into one or more smooth vector graphics 924 as illustrated in FIG. 9C. Some embodiments may include options to provide a custom naming convention to the vector graphics 924 and further save, using input control 928, the vector graphics 924 locally or on a cloud-based storage device, as previously described herein. The vector graphics can be converted using, for instance, vector graphic conversion component 216 of FIG. 2. Once an instruction is received to save the vector graphic 924, for example, from save input control 928 of FIG. 9C, some embodiments may save the vector graphic 924 in a library 932, as illustrated in FIG. 9D, including none or more previously captured salient contours in vector graphic form. The library 932 can be a vector graphic library locally stored on the computing device or similarly stored on a cloud-based storage device.

Figure 10:
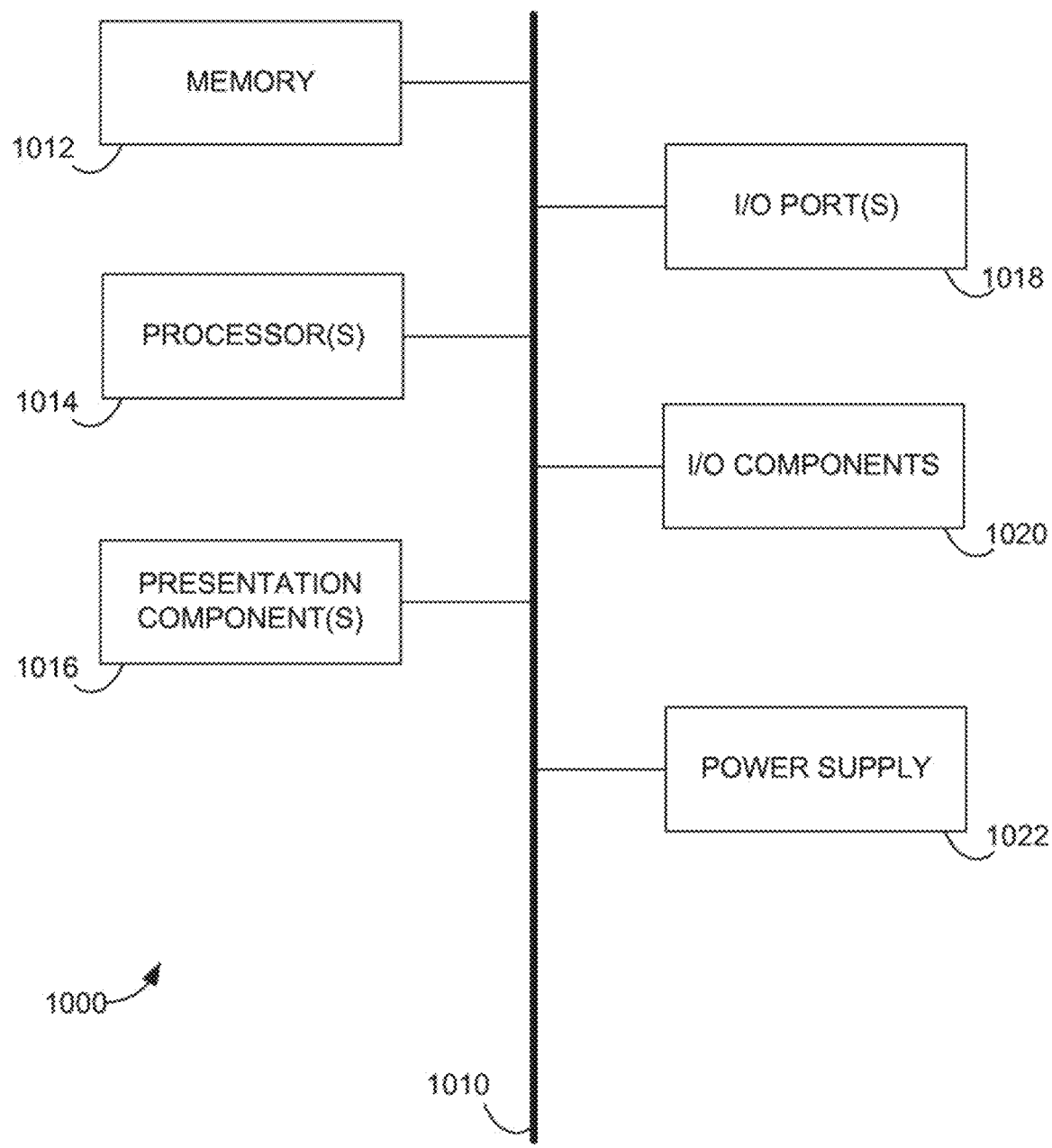
FIG. 10 is a block diagram of an exemplary computing device in which embodiments of the invention may be employed.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, providing a live preview of salient contours generated in real time in accordance with a live video feed. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations for previewing salient contours, the operations comprising:
providing for display, a first preview, the first preview including a first frame of a live digital video with at least one detected edge from the first frame and corresponding adjacent gradients overlaid on the first frame of the live digital video;
adjusting at least one aspect of the live digital video in response to a received user input; and
providing for display, a second preview, the second preview including an updated first frame of the live digital video with at least one modified detected edge from the updated first frame and corresponding adjacent gradients overlaid on the updated frame of the live digital video, the at least one modified detected edge based on the adjustment to the live digital video.

2. The non-transitory computer storage medium of claim 1, wherein adjusting the at least one aspect of the live digital video comprises inverting the live digital video.

3. The non-transitory computer storage medium of claim 1, wherein the first frame and the updated first frame are each provided for display in greyscale.

4. The non-transitory computer storage medium of claim 3, wherein the at least one detected edge and corresponding adjacent gradients, and the at least one modified detected edge and corresponding adjacent gradients are each provided for display utilizing a bright, solid color to clearly contrast with the respective frame.

5. The non-transitory computer storage medium of claim 1, wherein the at least one detected edge and the at least one modified detected edge are each detected utilizing an edge-detecting filter.

6. The non-transitory computer storage medium of claim 5, wherein the corresponding adjacent gradients are detected utilizing a plurality of filters configured to collectively preserve at least some color gradient information corresponding to at least some pixels adjacent to either one of the at least one detected edge and the at least one modified detected edge to detect the corresponding adjacent gradients.

7. The non-transitory computer storage medium of claim 1, wherein the first preview and the second preview are each a preview of salient contours to be generated from a respective frame of the live digital video.

8. A non-transitory computer storage medium storing computer-useable instructions that, when used by one or more computing devices, cause the one or more computing devices to perform operations for previewing salient contours, the operations comprising:
providing for display, a first preview, the first preview including a first frame of a live digital video with at least one detected edge from the first frame and corresponding adjacent gradients overlaid on the first frame of the live digital video;
adjusting at least one aspect of the live digital video in response to a received user input; and
providing for display, a second preview, the second preview including an updated first frame of the live digital video feed with at least one modified detected edge from the updated first frame and corresponding adjacent gradients overlaid on the updated frame of the live digital video, the at least one modified detected edge based on the adjustment to the live digital video.

9. The non-transitory computer storage medium of claim 8, wherein adjusting the at least one aspect of the live digital video comprises applying at least one filter to the live digital video.

10. The non-transitory computer storage medium of claim 9, the at least one filter being configured to collectively preserve at least some gradient information corresponding to at least some pixels adjacent to the at least one detected edge to detect the corresponding adjacent gradients.

11. The non-transitory computer storage medium of claim 10, the at least one filter including a first filter operable to generate at least some progressive gradients adjacent to the at least one detected edge.

12. The non-transitory computer storage medium of claim 11, the first filter being a Gaussian blur filter.

13. The non-transitory computer storage medium of claim 11, the at least one filter further including a second filter operable to intensify contrast in color values associated with the at least some progressive gradients generated by the first filter.

14. The non-transitory computer storage medium of claim 13, the second filter being a modified threshold filter configured to intensify color values.

15. The non-transitory computer storage medium of claim 8, wherein the at least one detected edge is detected utilizing an edge-detecting filter.

16. A non-transitory computer storage medium storing computer-useable instructions that, when used by one or more computing devices, cause the one or more computing devices to perform operations for capturing salient contours, the operations comprising:
 providing a first preview for display, the first preview including a first frame of a live digital video with at least one detected edge from the first frame and corresponding adjacent gradients overlaid on the first frame of the live digital video;
 adjusting at least one aspect of the live digital video in response to a received user input; and
 providing a second preview for display, the second preview including the first frame of the live digital video with at least one modified detected edge from the first frame and the corresponding adjacent gradients overlaid on the first frame of the live digital video, the at least one modified detected edge based on the adjustment to the live digital video.

17. The non-transitory computer storage medium of claim 16, wherein the at least one detected edge is detected utilizing an edge-detecting filter.

18. The non-transitory computer storage medium of claim 16, wherein adjusting the at least one aspect of the live digital video comprises inverting the live digital video.

19. The non-transitory computer storage medium of claim 17, wherein the corresponding adjacent gradients are detected utilizing the adjusted at least one aspect of the live digital video, wherein the at least one aspect is adjusted based on a plurality of filters configured to collectively preserve at least some gradient information corresponding to at least some pixels adjacent to the at least one detected edge to detect the corresponding adjacent gradients.

20. The non-transitory computer storage medium of claim 19, wherein the plurality of filters include a first filter operable to generate at least some progressive gradients adjacent to the at least one detected edge and a second filter operable to intensify contrast in color values associated with the at least some progressive gradients generated by the first filter.

* * * * *